United States Patent
Chen

(10) Patent No.: US 10,432,091 B2
(45) Date of Patent: Oct. 1, 2019

(54) ADAPTIVE FEEDBACK CONTROL SYSTEM AND METHOD FOR VOLTAGE REGULATORS

(71) Applicant: SEMICONDUCTOR COMPONENTS INDUSTRIES, LLC, Phoenix, AZ (US)

(72) Inventor: Gang Chen, Tai Po (HK)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/856,183

(22) Filed: Dec. 28, 2017

(65) Prior Publication Data

US 2018/0123460 A1    May 3, 2018

Related U.S. Application Data

(63) Continuation of application No. 15/158,327, filed on May 18, 2016, now Pat. No. 9,887,626.

(Continued)

(51) Int. Cl.
*G05F 1/595* (2006.01)
*H02M 3/158* (2006.01)
(Continued)

(52) U.S. Cl.
CPC ............. *H02M 3/158* (2013.01); *H02M 1/08* (2013.01); *H02M 3/156* (2013.01);
(Continued)

(58) Field of Classification Search
CPC ............. H02M 3/156; H02M 3/33507; H02M 2001/0009; H02M 3/1588; H02M 2001/009; Y02B 7/01466
(Continued)

(56) References Cited

U.S. PATENT DOCUMENTS

| | | | | |
|---|---|---|---|---|
| 4,823,070 A | * | 4/1989 | Nelson | H02M 1/36 323/285 |
| 5,627,460 A | * | 5/1997 | Bazinet | G05F 1/618 323/224 |

(Continued)

OTHER PUBLICATIONS

Redl, R. et al., Ripple-Based Control of Switching Regulators—An Overview, IEEE Transactions on Power Electronics, 24(12)2669-2680 (2009).

*Primary Examiner* — Rajnikant B Patel
(74) *Attorney, Agent, or Firm* — AMPACC Law Group, PLLC

(57) ABSTRACT

A voltage regulator includes a first feedback circuit, a second feedback circuit, and a feedback signal adaptive circuit. The first voltage feedback circuit includes an amplifier that is configured to generate a compensation signal according to a feedback signal from an output of the voltage regulator and a reference voltage, while the second voltage feedback circuit includes a comparator that is configured to generate a PWM signal to drive a switch circuit in which the comparator initiates the PWM pulse when the feedback voltage goes lower than the compensation signal and ends the PWM pulse when the sum of the feedback signal and a ramp signal exceeds the sum of the compensation signal and a threshold signal. The feedback signal adaptive circuit modifies the feedback signal according to changes in an input voltage of the voltage regulator and a control signal.

20 Claims, 3 Drawing Sheets

Related U.S. Application Data

(60) Provisional application No. 62/277,112, filed on Jan. 11, 2016.

(51) Int. Cl.
   *H02M 1/08* (2006.01)
   *H02M 3/156* (2006.01)
   *H02M 1/00* (2006.01)

(52) U.S. Cl.
   CPC ........... *H02M 2001/0009* (2013.01); *H02M 2001/0025* (2013.01); *H02M 2001/0048* (2013.01); *Y02B 70/1491* (2013.01)

(58) Field of Classification Search
   USPC ....... 323/222, 224, 225, 259, 271, 282–288; 363/16, 21.05, 21.08, 21.12, 21.17, 95, 363/97, 98, 132
   See application file for complete search history.

(56) References Cited

U.S. PATENT DOCUMENTS

| | | | |
|---|---|---|---|
| 5,770,940 A | 6/1998 | Goder | |
| 5,773,966 A | 6/1998 | Steigerwald | |
| 6,377,032 B1* | 4/2002 | Andruzzi | H02M 3/1588 323/224 |
| 6,465,993 B1* | 10/2002 | Clarkin | H02M 3/156 323/272 |
| 6,642,631 B1* | 11/2003 | Clavette | H02J 1/102 307/52 |
| 6,728,117 B2* | 4/2004 | Schemmann | H02M 3/3381 363/21.12 |
| 7,180,274 B2* | 2/2007 | Chen | H02M 3/1588 323/222 |
| 7,453,251 B1* | 11/2008 | Mehas | H02M 3/156 323/299 |
| 7,522,431 B2 | 4/2009 | Huynh et al. | |
| 7,743,266 B2* | 6/2010 | Chapuis | H02M 3/157 323/234 |
| 9,065,385 B2 | 6/2015 | Gorbachov | |
| 9,467,051 B2 | 10/2016 | Stoichita et al. | |
| 9,548,651 B2* | 1/2017 | Guo | H02M 1/14 |
| 9,577,309 B2 | 2/2017 | Tamura | |
| 9,647,556 B2* | 5/2017 | Li | H02M 3/1584 |
| 2012/0212204 A1* | 8/2012 | Philbrick | H02M 3/156 323/284 |
| 2014/0361755 A1 | 12/2014 | Tateishi et al. | |

* cited by examiner

ADAPTIVE FEEDBACK CONTROL SYSTEM AND METHOD FOR VOLTAGE REGULATORS

CROSS-REFERENCE TO RELATED APPLICATION

This application is a continuation of U.S. application Ser. No. 15/158,327, filed May 18, 2016, now U.S Pat. No. 9,887,626, issued Feb 6, 2018, which claims the benefit of U.S. Provisional Application No. 62/277112, filed on Jan. 11, 2016, each of which applications is incorporated herein by reference in their entirety.

TECHNICAL FIELD

Aspects of the present disclosure relate to voltage regulators and, in particular, to an adaptive feedback control system and method for voltage regulators.

BACKGROUND

Voltage regulators are commonly used for providing electrical power with a stable voltage. A particular type of voltage regulator includes a switching regulator that controls an output voltage of the voltage regulator using one or more switches that are switched on and off with a duty cycle proportional to a measured output voltage of an output of the voltage regulator. The switches typically include metal-oxide semiconductor field effect transistor (MOSFETs) devices that are controlled by a switching circuit, such as a pulse-width-modulation (PWM) circuit in which the pulse width is modulated according to changes in output voltage, or a constant on time (COT) circuit in which pulse width is maintained constant while a duration between pulses is modulated according to changes in output voltage.

SUMMARY

According to one aspect, a voltage regulator includes a first feedback circuit, a second feedback circuit, and a feedback signal adaptive circuit. The first voltage feedback circuit includes an amplifier that is configured to generate a compensation signal according to a feedback signal from an output of the voltage regulator and a reference voltage, while the second voltage feedback circuit includes a comparator that is configured to generate a PWM signal to drive a switch circuit in which the comparator initiates the PWM pulse when the feedback voltage goes lower than the compensation signal and ends the PWM pulse when the sum of the feedback signal and a ramp signal exceeds the sum of the compensation signal and a threshold signal. The feedback signal adaptive circuit modifies the feedback signal according to changes in an input voltage of the voltage regulator and a control signal.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters may refer to the same parts throughout the different views. The drawings depict only typical embodiments of the present disclosure and, therefore, are not to be considered limiting in scope.

DETAILED DESCRIPTION

Figure 1:
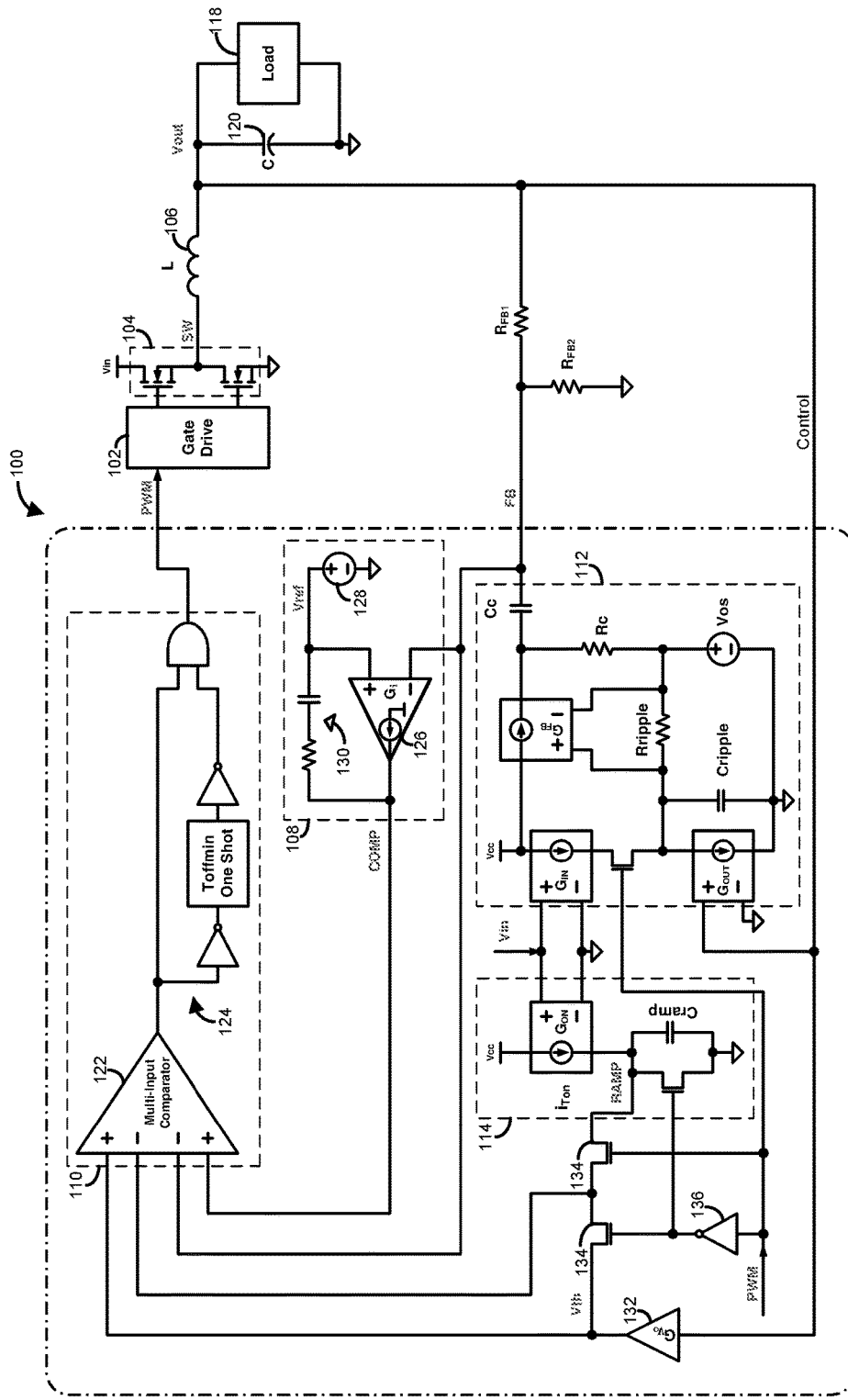
FIG. 1 illustrates an example switching voltage regulator that may be provided with adaptive feedback control according to one embodiment of the present disclosure.

Aspects of a control circuit topology described herein provide a circuit and method for voltage regulation using a first feedback circuit that provides for precise static control of the output voltage, a second feedback circuit that provides for dynamic control of the output voltage, and a feedback signal adaptive circuit that adapts how the second feedback circuit dynamically controls the voltage regulator according to changes in the input voltage and/or a control input. The control input may be coupled to any suitable source, such as the output of the voltage regulator for providing enhanced control over transient changes in loading, to an external signal for providing feed-forward control, or to the output of a switch circuit for implementations where direct sensing of the output voltage may not be readily available.

Switching voltage regulators are a particular type of voltage regulator that controls an output voltage using a switching circuit that is switched on and off with a duty cycle proportional to a measured output voltage of the voltage regulator. These switching voltage regulators may include circuitry to generate a PWM signal having fixed switching frequency, or they may include circuitry that generates the PWM signal via astable multivibrator operation (e.g., the PWM signal turns on or off according to one or more quiescent sense points in the voltage regulator). Those switching voltage regulators that function according to an astable multivibrator topology may be more cost effective than other types of voltage regulator topologies because, among other things, they can often be implemented with fewer parts.

Use of switching voltage regulators may provide enhanced efficiency over conventional regulators by reducing or limiting a voltage drop across certain control elements in the voltage regulator. That is, a switching voltage regulator regulates its output by alternatively switching one or more switches on (e.g., logic hi) and off (e.g., logic lo) with a duty cycle sufficient to maintain regulation while keeping the switches at or near a saturated condition in either their on or off states. Nevertheless, the use of switching voltage regulators has several challenges to be overcome to ensure their proper operation. For example, because it would be beneficial to provide a switching voltage regulator having a minimum number of components, many currently available switching voltage regulators are often provided by integrated circuit (IC) chips in which one or more of the components of the switching voltage regulators are integrated into a single package. Nevertheless, external compensation networks having numerous external components are often required to ensure that the switching voltage regulator remains stable over large changes in operating conditions (e.g., transient loading conditions, changes in input voltage, etc.). Additionally, maintaining adequate efficiency over a wide range of output conditions (e.g., no load to full load) is often difficult to obtain. In many cases, switching voltage regulators are designed against many operating factors, such as current consumption, transient performance, bandwidth limitations, component quantity, and overall component costs, which can often require the addition of more components.

One particular type of topology that has been introduced to solve some of these problems includes a $V^2$ control circuit topology. The $V^2$ control circuit topology generally includes two feedback paths in which a first feedback path includes an error amplifier to provide precise output control, and a second feedback path to correct for transient changes in the output voltage of the switching voltage regulator. However, $V^2$ control circuit topologies are not readily adaptable to loads with capacitors having low equivalent series resistance (ESR) (e.g., ceramic capacitors, tantalum capacitors, etc.). The stability of $V^2$ control circuits are also sensitive to filter variations and printed circuit board (PCB) layout.

FIG. 1 illustrates an example switching voltage regulator 100 that may be provided with adaptive feedback control according to one embodiment of the present disclosure. The switching voltage regulator 100, in this particular case is a synchronous buck converter that converts an input voltage (Vin) to an output voltage (Vout). In other embodiments, any suitable type of switching voltage regulator may be provided with adaptive feedback control, such as boost converters, buck-boost converters, or other type of switching voltage regulators. The switching voltage regulator 100 includes a gate drive circuit 102, a switching circuit 104, an inductor 106, a first feedback circuit 108, a second feedback circuit 110, a feedback signal adaptive circuit 112, and a ramp generation circuit 114. Although one particular type of switching voltage regulator 100 is shown, it should be understood that other embodiments may include additional, fewer, or different components and/or circuitry than what is shown and described herein without departing from the spirit and scope of the present disclosure.

The second feedback circuit 110 generates a PWM signal that is fed to the switching circuit 104, via the drive circuit 102, to selectively apply electrical power from the input (Vin) to the output (Vout), which may be coupled to a load 118 and a capacitor 120. The second feedback circuit 110 generally includes a multi-input comparator 122 and a minimum off time circuit 124. The comparator 122 is responsive to a threshold voltage (Vth), a ramp signal provided by the ramp circuit 114, a feedback (FB) signal, and a compensation (COMP) signal provided by the first feedback circuit 108 to alternatively change from an on state (e.g., logic hi) to an off state (e.g., logic lo) for switching the switch circuit 104 via the gate drive circuit 102. Moreover, a pulse-width modulated (PWM) pulse is initiated when the feedback voltage goes lower than the COMP signal and ended when the sum of the feedback FB signal and the RAMP signal exceeds the sum of the compensation signal and the threshold signal.

The minimum off time circuit 124 is provided to ensure that the PWM signal continues to switch between on and off states, such as when relatively large loading conditions are incurred on the output voltage (Vout). That is, the minimum off time circuit 124 assures the off time occurs in the PWM signal after each on time is longer in duration than a minimum value. Such behavior may be good for operation of gate drivers and current sense circuits based on low-side switches that cannot inherently sense overloading conditions during the on time of the PWM signal. Nevertheless, the minimum off time circuit 124 may be omitted if not needed for proper operation of the switching voltage regulator 100. The minimum off time circuit 124 includes a monostable generator that generates a pulse with a specified duration (e.g., 100 nano-seconds). The pulse is used to gate the PWM signal from the second feedback circuit 110 such that, in the event that the comparator 122 is driven to a continuously on state, the PWM signal still continues to switch between on and off states.

The first feedback circuit 108 includes an error amplifier 126, a reference voltage source 128, and a compensation network such as a resistor-capacitor circuit (RC) 130. The error amplifier 126 monitors the difference between the feedback (FB) signal and the voltage reference (Vref) signal to provide the compensation (COMP) signal. The RC circuit 130 provides low-pass filtering so that the error amplifier 126 remains stable over a wide range of frequency perturbations caused by output load and input voltage fluctuations.

The threshold voltage (Vth) is provided by a threshold generator 132 that generates a threshold voltage Vth proportional to the output voltage (Vout). The ramp generator 114 creates a RAMP signal having a slew rate proportional to the input voltage (Vin). The output of the ramp generator 114 is only coupled to an inverting input of the PWM comparator during the on time of PWM pulses using the PWM signal that gates the RAMP signal using transistors 134 and an inverter 136. The ramp generator 114 includes a trans-conductance device (Gon) that generates a current proportional to the input voltage (Vin) that is applied across a capacitor (Cramp). Therefore, the amplitude of the RAMP signal is proportional to the Vin level and the on time of the PWM signal to obtain adaptive pulse width control of PWM signal.

The feedback signal adaptive circuit 112 modifies the FB signal according to changes in the input voltage and a control signal which in this particular embodiment, is coupled to the output of the switching voltage regulator 100. The feedback signal adaptive circuit 112 injects an alternating current (AC) ripple voltage into the FB signal to adapt the feedback loop of the second feedback circuit 110 according to changes in input voltage (Vin) and the control signal. The feedback signal adaptive circuit 112 generally includes a trans-conductance device (Gin), which is gated by the PWM signal to charge a capacitor (Cripple) when the PWM signal is in a logic hi state. The feedback signal adaptive circuit 112 also includes a trans-conductance device (Gout) to discharge a capacitor (Cripple) according to the control signal. The capacitor (Cripple) and a resistor (Rripple) form a RC circuit such that cyclic variations in voltage charged across the capacitor (Cripple) are applied to an input of a trans-conductance device (Gfb). Trans-conductance device (Gfb) generates the AC ripple current in response to the cyclic voltage variations formed across the resistor (Rripple). Thus, the FB signal may be adaptively modified to compensate for transient changes in the input voltage (Vin) and voltages present on the control signal.

A capacitor (Cc) and a resistor (Rc) form a RC circuit for injecting the AC ripple voltage into the FB signal. That is, the capacitor (Cc) blocks direct current (DC) bias in the feedback signal adaptive circuit 112 from the FB signal in which the DC bias is generated across the resistor (Rc) and an offset voltage (Vos). The stability and dynamic response of the switching voltage regulator 100 may be adjusted by a feedback resistor (RFB1). In continuous-conduction-mode (CCM), trans-conductance device (Gin) charges capacitor (Cripple) during PWM on time and the trans-conductance device (Gout) discharges the capacitor (Cripple). Resistor (Rripple) provides a DC bias operation voltage from Vos to Cripple. The trans-conductance device (Gfb) converts the voltage difference (e.g., VCripple−Vos) into a current coupled into FB node through capacitor (Cc). The resistor (Rc) provides a DC bias operation voltage from the offset voltage (Vos) to the capacitor (Cc). In one embodiment, time constants (τ) of the RC circuit formed by resistor (Rripple) and capacitor (Cripple) (e.g., Rripple*Cripple) and resistor (Rc) and capacitor (Cc) (e.g., Rc*Cc) are larger or significantly larger than the CCM switching period. In another embodiment, the time constants (τ) of (Rripple*Cripple) and (Rc*Cc) are set to be relatively equal to one another.

Embodiments of the present disclosure may provide certain advantages not heretofore recognized by conventional switching voltage regulator topologies. For example, use of the feedback signal adaptive circuit 112 may alleviate the necessity of additional components that would otherwise be required for compensating a switching voltage regulator's feedback loop for stability under varying input and output conditions. Whereas traditional switching voltage regulator topologies have often required relatively large quantities of components to provide compensation, the feedback signal adaptive circuit 112 alleviates this necessity. In many cases, it is beneficial to implement switching voltage regulators in which some or most of their constituent components can be integrated into a single integrated circuit (IC) chip, thus incurring minimal external parts requirements. However, conventional switching voltage regulator topologies often require compensation circuitry that needs to be implemented as discrete components, thus requiring a relatively high parts count. The feedback signal adaptive circuit 112 is easily integrated on the same monolithic substrate that the other components (e.g., first feedback circuit 108, second feedback circuit 110, gate drive circuit 102, ramp generator 114, etc.) are integrated such that overall parts count may be minimized while providing effective compensation for the switching voltage regulator's stable operation.

Figure 2:
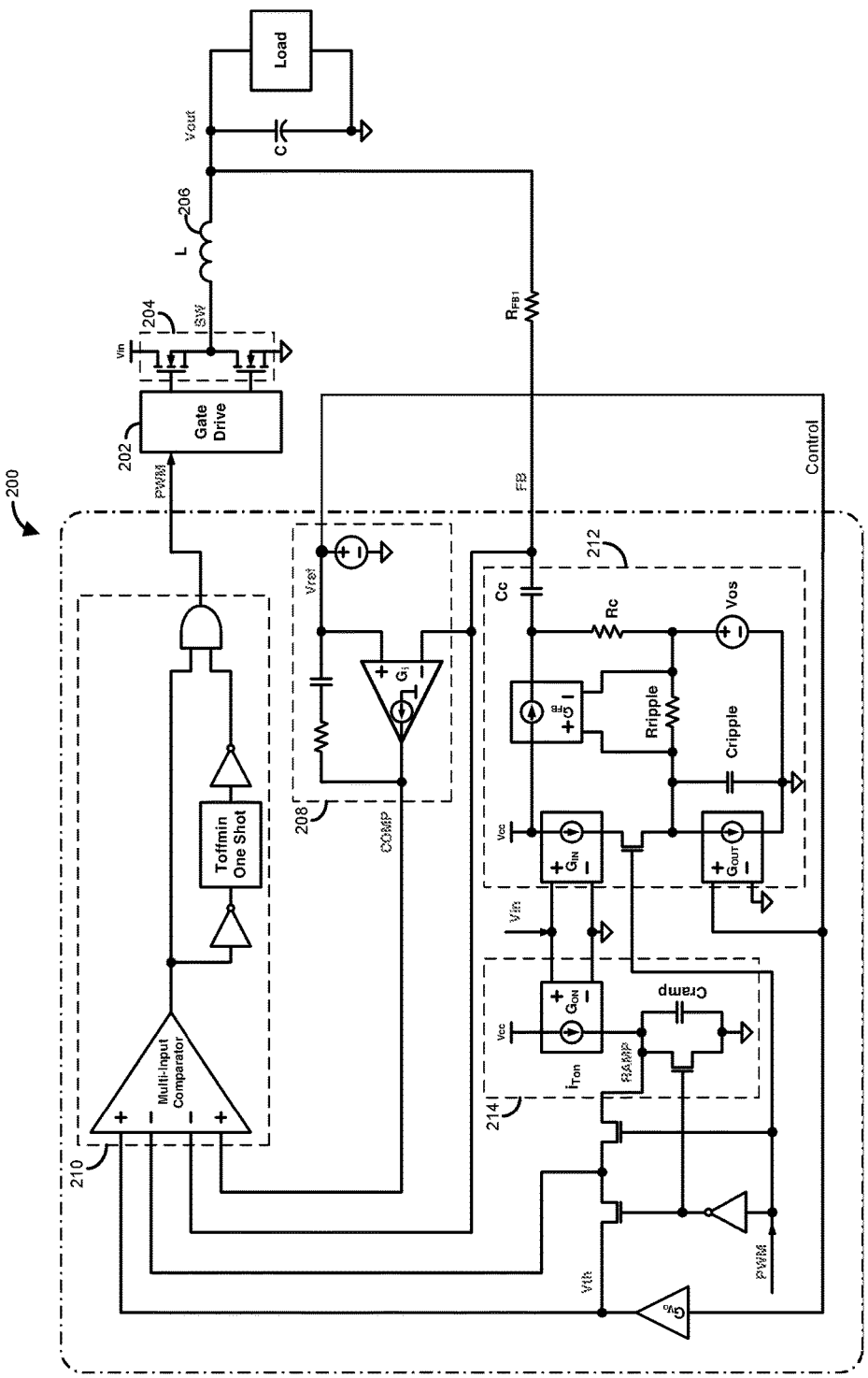
FIG. 2 illustrates another example switching voltage regulator that may be provided with adaptive feedback control according to one embodiment of the present disclosure.

FIG. 2 illustrates another example switching voltage regulator 200 that may be provided with adaptive feedback control according to one embodiment of the present disclosure. In general, the switching voltage regulator 200 includes a gate drive circuit 202, a switching circuit 204, an inductor 206, a first feedback circuit 208, a second feedback circuit 210, a feedback signal adaptive circuit 212, and a ramp generation circuit 214 that are similar in design and construction to the gate drive circuit 102, switch circuit 104, inductor 106, first feedback circuit 108, second feedback circuit 110, feedback signal adaptive circuit 112, and ramp generation circuit 114, respectively, as shown and described above with respect to FIG. 1. The switching voltage regulator 200 differs, however, in that the control line is not coupled to the output voltage (Vout); rather, it is available for connection to some other nodes like Vref which may be an output of a digital to analog converter (DAC). Additionally, the Rfb2 resistor as shown in FIG. 1 does not need to be connected from the FB signal to ground. The switching voltage regulator 200 may be particularly suitable for DAC tracking applications that may use a switching voltage regulator whose output can be varied according to a control signal Vref.

Figure 3:
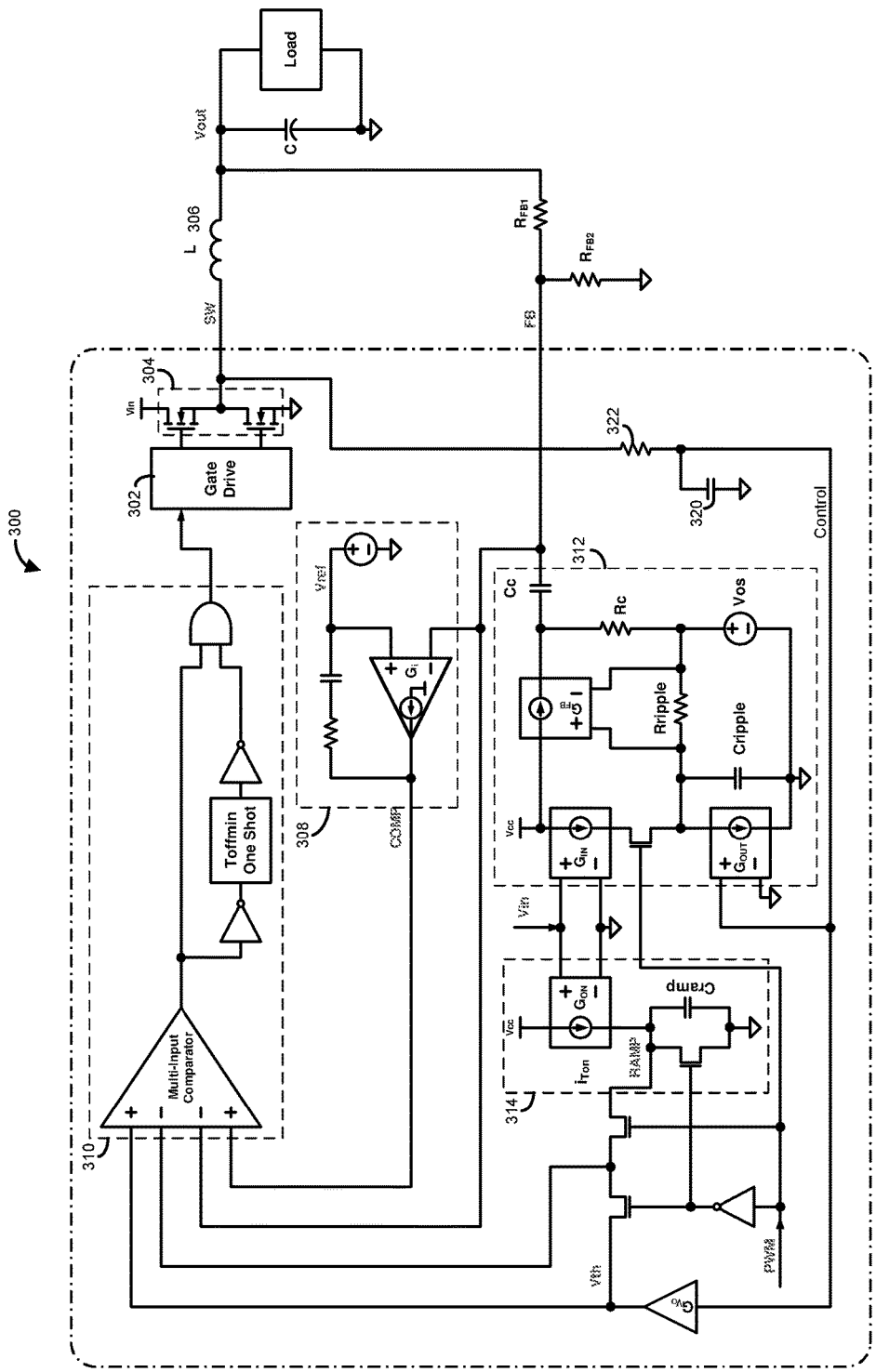
FIG. 3 illustrates yet another example switching voltage regulator that may be provided with adaptive feedback control according to one embodiment of the present disclosure.

FIG. 3 illustrates another example switching voltage regulator 300 that may be provided with adaptive feedback control according to one embodiment of the present disclosure. the switching voltage regulator 300 includes a gate drive circuit 302, a switching circuit 304, an inductor 306, a first feedback circuit 308, a second feedback circuit 310, a feedback signal adaptive circuit 312, and a ramp generation circuit 314 that are similar in design and construction to the gate drive circuit 102, switching circuit 104, inductor 106, first feedback circuit 108, second feedback circuit 110, feedback signal adaptive circuit 112, and ramp generation circuit 114, respectively, as shown and described above with respect to FIG. 1. The switching voltage regulator 300 differs, however, in that the control line is coupled to an output of the switch circuit 304 rather than the output voltage (Vout). This particular topology may be beneficial for applications that may not provide easy access to direct sensing of the output voltage (Vout). In the present case, an estimated level of the output voltage (Vout) can be achieved by filtering the switching (SW) signal using a RC circuit formed by a capacitor 320 and a resistor 322.

Although the switching voltage regulators 100, 200, and 300 illustrate example embodiments of circuits that may be used to provide adaptive feedback control for voltage regulators, other embodiments may have other topologies without departing from the spirit and scope of the present disclosure. For example, other embodiments may include additional components, fewer components, or different components that what is described herein. Additionally, certain components of each of the example switching voltage regulators 100, 200, and 300 may be integrated into a monolithic circuit chip, while other components are implemented using discrete circuitry.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An electrical circuit comprising:
    a switching regulator circuit comprising a comparator and configured to receive a feedback signal and produce, using the comparator, a Pulse Width Modulated (PWM) signal according to the feedback signal; and
    a feedback signal adaptive circuit comprising a first capacitor, a first input for receiving the PWM signal, a second input for receiving a control signal, and a third input for receiving an input voltage, the feedback signal adaptive circuit configured to:
        generate a ripple voltage according to the PWM signal, a value of the input voltage, and a value of the control signal by charging the first capacitor according to the input voltage during an on time of the PWM signal, discharging the first capacitor according to the control signal during an off time of the PWM signal, and generating the ripple voltage according to a voltage across the first capacitor, generate, as an output of a first trans-conductance device, a ripple current according to the ripple voltage, and modify the feedback signal using the ripple current by coupling a second capacitor between the output of the first trans-conductance device and the feedback signal.

2. The electrical circuit of claim 1, wherein the feedback signal adaptive circuit further comprises a second trans-conductance device, a third transconductance device, and a first resistor, and wherein the feedback signal adaptive circuit is configured to:

charge the first capacitor using the third trans-conductance device and at a rate according to a voltage value of the input voltage during the on time of the PWM signal;

discharge the first capacitor using the second trans-conductance device and at a rate according to a value of the control signal during the off time of the PWM signal; and generate the ripple voltage across the first resistor according to a voltage across the first capacitor.

3. The electrical circuit of claim 2, wherein a first time constant corresponding to a product of a resistance of the first resistor and a capacitance of the first capacitor is larger than a time period of the PWM signal.

4. The electrical circuit of claim 2, wherein the feedback signal adaptive circuit further comprises a second resistor, the second capacitor configured to inject the ripple current into the feedback signal and to block a direct current (DC) bias in the feedback signal adaptive circuit, the DC bias being generated using the second resistor and an offset voltage.

5. The electrical circuit of claim 4, wherein a second time constant corresponding to a product of a resistance of the second resistor and a capacitance of the second capacitor is larger than a time period of the PWM signal.

6. The electrical circuit of claim 1, wherein the control signal is coupled to an output of a voltage regulator.

7. The electrical circuit of claim 1, wherein the control signal is coupled to the output of the switch circuit.

8. The electrical circuit of claim 1, wherein the control signal is coupled to a reference voltage source, wherein an output of a voltage regulator tracks a voltage of the reference voltage source.

9. The electrical circuit of claim 1, further comprising:

the switching regulator circuit configured to receive a threshold signal, and a ramp signal and produce the PWM signal according to the feedback signal, the threshold signal, and the ramp signal;

a threshold generator to generate the threshold signal proportional to the control signal; and a ramp generator to generate the ramp signal having a slew rate proportional to the input voltage.

10. The electrical circuit of claim 1, wherein the feedback signal is generated using the input voltage and according to the PWM signal.

11. A voltage regulating method comprising:

receiving a feedback signal generated from an output of a voltage regulator;

generating a Pulse Width Modulation (PWM) signal using a comparator and according to the feedback signal;

generating a ripple current according to the PWM signal, an input voltage of the voltage regulator, and a control signal by charging a first capacitor according to the input voltage during an on time of the PWM signal, discharging the first capacitor according to the control signal during an off time of the PWM signal, and generating, as an output of a trans-conductance device, the ripple current using a voltage across the first capacitor; and modifying the feedback signal by injecting, through a coupling capacitor coupled between the output of a trans-conductance device and the feedback signal, the ripple current into the feedback signal.

12. The voltage regulating method of claim 11, wherein generating the ripple current comprises:

charging the first capacitor according to a voltage value of the input voltage during the on time of the PWM signal;

discharging the first capacitor according to a voltage value of the control signal during the off time of the PWM signal;

generating, using the voltage across the first capacitor, a ripple voltage across a first resistor; and generating the ripple current according to the ripple voltage.

13. The voltage regulating method of claim 12, wherein a first time constant corresponding to a product of a resistance of the first resistor and a capacitance of the first capacitor is larger than a time period of the PWM signal.

14. The voltage regulating method of claim 12, further comprising:

generating a Direct Current (DC) bias current using an offset voltage and a second resistor;

combining the ripple current and the DC bias current;

injecting, using the coupling capacitor, the ripple current into the feedback signal; and preventing, using the coupling capacitor, the DC bias current from being injected into the feedback signal.

15. The voltage regulating method of claim 14, wherein a second time constant corresponding to a product of a resistance of the second resistor and a capacitance of the coupling capacitor is larger than a time period of the PWM signal.

16. The voltage regulating method of claim 11, wherein the control signal is coupled to the output of the voltage regulator.

17. The voltage regulating method of claim 11, wherein the control signal is coupled to the output of the switch circuit.

18. The voltage regulating method of claim 11, wherein the control signal is coupled to a reference voltage source, the output of the voltage regulator tracking the voltage of the reference.

19. The voltage regulating method of claim 11, further comprising:

generating a threshold signal proportional to the control signal;

generating a ramp signal having a slew rate proportional to the input voltage; and generating the PWM signal according to the feedback signal, the threshold signal, and the ramp signal.

20. The voltage regulating method of claim 11, wherein the output of the voltage regulator is generated according to the PWM signal and from the input voltage.

* * * * *